(12) United States Patent
Katooka et al.

(10) Patent No.: US 7,339,807 B2
(45) Date of Patent: Mar. 4, 2008

(54) POWER SUPPLY APPARATUS

(75) Inventors: Masao Katooka, Osaka (JP); Tetsuro Ikeda, Osaka (JP); Kenzo Danjo, Osaka (JP); Takeshi Morimoto, Osaka (JP); Hideo Ishii, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 0 days.

(21) Appl. No.: 11/651,299

(22) Filed: Jan. 8, 2007

(65) Prior Publication Data

US 2007/0165433 A1 Jul. 19, 2007

(30) Foreign Application Priority Data

Jan. 17, 2006 (JP) ............................. 2006-008669

(51) Int. Cl.
*H02M 7/00* (2006.01)
*H02H 7/122* (2006.01)
(52) U.S. Cl. ..................................... 363/71; 363/55
(58) Field of Classification Search ................ 363/55, 363/56.01, 65, 71, 78, 95
See application file for complete search history.

(56) References Cited

U.S. PATENT DOCUMENTS 5,886,890 A * 3/1999 Ishida et al. .................. 363/71
6,678,174 B2 * 1/2004 Suzui et al. .................. 363/55
6,999,329 B2 * 2/2006 Poyhonen et al. ............. 363/71

FOREIGN PATENT DOCUMENTS

JP        05277731       10/1993

* cited by examiner

Primary Examiner—Jessica Han
(74) Attorney, Agent, or Firm—Duane Morris, LLP

(57) ABSTRACT

One of a plurality of voltages is adapted to be applied to power supply terminals (2a, 2b, 2c). A rectifying circuit (6) rectifies the applied voltage and develops a rectified voltage between the output terminals (6a, 6b) thereof. Inverters (16a, 16b) are connected into one of a plurality of inverter connections between the rectifier output terminals (6a, 6b) in response to one of a plurality of inverter connection indicative signals. The inverter connections are set to correspond to respective ones of the plurality of voltages, so that a predetermined voltage can be applied to each inverter whichever one of the plurality of voltages is applied to the power supply terminals. An inverter connection indicative signal generating circuit (34) is manually operated to generate a desired one of the inverter connection indicative signals. A thyristor (8) is disposed between the rectifier output terminals (6a, 6b) and the inverters (16a, 16b). When one of the plurality of voltages is applied to the power supply terminals, a voltage detecting circuit (38) generates an inverter connection indicative signal corresponding to the voltage applied to the power supply terminals. A judging unit (26d) determines whether or not the inverter connection indicative signals from the voltage detecting circuit (38) and the inverter connection indicative signal generating circuit (34) match. When the two signals match, a thyristor control unit (26a) provides a CLOSE signal to the thyristor (8). When the two signals do not match, an alarm circuit (42) is activated.

5 Claims, 3 Drawing Sheets

POWER SUPPLY APPARATUS

This invention relates to a power supply apparatus and, more particular, to a power supply apparatus which can receive a selected one of a plurality of AC voltages and supplies desired power prepared from the received AC voltage.

BACKGROUND OF THE INVENTION

An example of power supply apparatuses to which a selected one of different AC voltages can be supplied is disclosed in Japanese Patent No. 2,558,575. A selected one of commercial AC voltages, i.e. 400 V and 200 V, is adapted to be coupled to the power supply apparatus. The power supply apparatus includes a rectifying circuit for rectifying the AC voltage supplied to it, and two inverters. When an AC voltage of 400 V is applied to the power supply apparatus, the two inverters are connected in series in the output of the rectifying circuit, and, when an AC voltage of 200 V is applied to the power supply apparatus, the two inverters are connected in parallel in the output of the rectifying circuit. The switching between the series connection and parallel connection of the two inverters is done by the use of a plurality of switches. The switches are controlled by a switching control circuit. The switching control circuit places the switches in such a state as to connect the two inverters in series before either AC voltage is applied to the power supply apparatus, and, when either one of the AC voltages is applied, detects the AC voltage and compares it with a reference value to judge whether the applied AC voltage is 400 V or 200 V. If the applied AC voltage is judged to be 400 V, the state of the switches is maintained, whereas, if the applied AC voltage is 200 V, the switching control circuit switches appropriate one or more switches to make the two inverters connected in parallel. Further, the switching control circuit latches the result of the judgment in a latch circuit in order to use the output of the latch circuit in maintaining the two inverters connected in parallel.

The problems of this power supply apparatus include complexity of the switching control circuit, which makes the manufacturing cost high.

An object of the present invention is to provide an inexpensive power supply apparatus which can receive a selected one of a plurality of AC voltages and supplies desired power prepared from the received AC voltage.

SUMMARY OF THE INVENTION

A power supply apparatus according to one aspect of the present invention has a plurality of power supply terminals, to which one of a plurality of different AC voltages is adapted to be applied. A rectifying circuit rectifies the AC voltage supplied thereto from the power supply terminals and develops a rectified voltage having a magnitude corresponding to the supplied AC voltage between two output terminals thereof. The power supply apparatus further includes a plurality of inverters and a connecting circuit. The connecting circuit connects the inverters into one of a plurality of inverter connections selected in accordance with an inverter connection indicative signal. The connecting circuit may be formed of a plurality of switching devices, for example. The plurality of inverter connections correspond to respective ones of the plurality of AC voltages. Whichever one of the AC voltages is supplied to the power supply terminals, the inverter connection corresponding to the supplied AC voltage is selected so as to supply a predetermined voltage to the respective inverters. An inverter connection indicative signal generating circuit is manually operated to generate the inverter connection indicative signal corresponding to the supplied AC voltage. A normally open switch is disposed in the path extending between the two output terminals of the rectifying circuit and the plurality of inverters, preferably between the two output terminals of the rectifying circuit and the connecting circuit. The normally open switch is closed when it receives a CLOSE signal. When one of the AC voltages is applied to the power supply terminals, the inverter connection indicative signal corresponding to the applied AC voltage is generated in a voltage detecting circuit, and a judging circuit judges whether the inverter connection indicative signal generated by the voltage detecting circuit matches with the inverter connection indicative signal generated by the inverter connection indicative signal generating circuit. If the judging circuit judges that the inverter connection indicative signals generated by the voltage detecting circuit and the inverter connection indicative signal generating circuit match, the CLOSE signal is applied to the normally open switch from a normally-open-switch driving circuit. On the other hand, if the judging circuit judges that the inverter connection indicative signals generated by the voltage detecting circuit and the inverter connection indicative signal generating circuit do not match, an alarming circuit is operated.

In the power supply apparatus having the above-described arrangement, the connecting circuit connects the inverters into the inverter connection indicated by the inverter connection indicative signal from the inverter connection indicative signal generating circuit, while keeping the normally open switch open. The judging circuit judges whether the inverter connection indicative signal generated in the voltage detecting circuit, which should correspond to the applied AC voltage, matches with the inverter connection indicative signal generated by the inverter connection indicative signal generating circuit. If the two inverter connection indicative signals match, the normally-open-switch driving circuit causes the normally open switch to be closed. On the other hand, if the two inverter connection indicative signals do not match, an alarm circuit is activated. In accordance with an alarm generated by the alarm circuit, an operator manually operates the inverter connection indicative signal generating circuit so as to make it generate the inverter connection indicative signal corresponding to the applied AC voltage, and the connecting circuit connects the inverters into the inverter connection corresponding to the applied AC voltage.

A manually operable input switching device may be disposed between the power supply terminals and the rectifying circuit. When the input switching device is closed, the voltage judgment is made. If the inverter connection indicative signal corresponding to the applied AC voltage generated by the voltage detecting circuit and the inverter connection indicative signal generated by the inverter connection indicative signal generating circuit are judged not to match, the alarm circuit is activated. In response to the alarm given by the alarm circuit, the input switching device is opened, and the inverter connection indicative signal generated by the inverter connection indicative signal generating circuit is changed to match the inverter connection indicative signal provided from the voltage detecting circuit.

The inverter connection indicative signal generating circuit may be provided with a manually operable switch, which may be disposed near the input switching device. When the inverter connection indicative signal generated by the voltage detecting circuit upon closing the input switching device does not match the inverter connection indicative signal generated by the inverter connection indicative signal generating circuit, the alarm circuit operates immediately and the input switching device is manually opened. Since the manually operable switch is disposed near the input switching device, it can be immediately operated, so that the inverter connection indicative signals generated by the voltage detecting circuit and the inverter connection indicative signal generating circuit can immediately be made to match.

The plurality of AC voltages may be a first voltage and a second voltage lower than the first voltage. The magnitude of the first voltage may be, for example, twice that of the second voltage. In this case, two inverters are used. The connecting circuit connects the two inverters in a first inverter connection in which the two inverters are connected in series between the two output terminals of the rectifying circuit, or in a second inverter connection in which the two inverters are connected in parallel between the two output terminals of the rectifying circuit. The inverter connection indicative signal generating circuit generates either one of first and second inverter connection indicative signals desired by the user of the apparatus. The voltage detecting circuit generates the first inverter connection indicative signal when the first AC voltage is applied to the power supply terminals, and the second inverter connection indicative signal when the second AC voltage is applied to the power supply terminals.

With this arrangement, when the actually applied AC voltage, which is one of the two different valued voltages, is different from the voltage indicated by the inverter connection indicative signal generated by the inverter connection indicative signal generating circuit, it is possible to make the two inverters connected in the inverter connection or configuration corresponding to the actually applied AC voltage.

Each inverter may include a capacitor in its input. The capacitor is charged when the normally open switch is closed. The inverters are driven by an inverter driving circuit, which drives the respective inverters after the completion of charging of the capacitors when the judging circuit judges that the inverter connection indicative signal provided by the voltage detecting circuit matches the inverter connection indicative signal provided by the inverter connection indicative signal generating circuit.

With this arrangement, since the respective inverters operate after the completion of charging of the capacitors, the inverter outputs can be stable. It should be noted that the output voltage from each inverter may be voltage-transformed in a voltage transformer before converting it into a DC voltage by means of an AC-to-DC converting circuit. The resulting DC voltage may further be converted to an AC voltage by a DC-to-AC converting circuit.

BEST MODE FOR CARRYING OUT THE INVENTION

Figure 1:
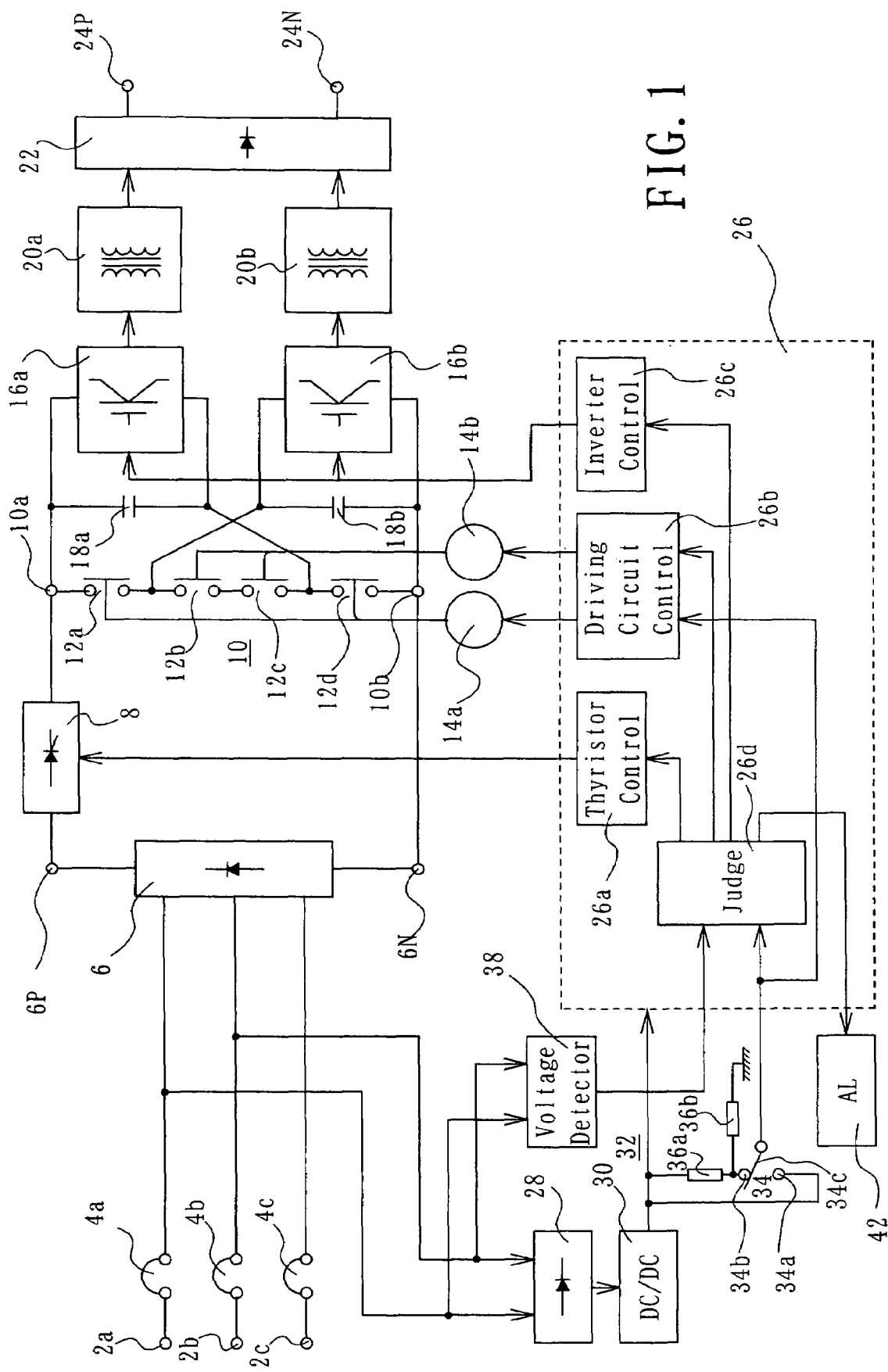
FIG. 1 is a block circuit diagram of a power supply apparatus according to an embodiment of the present invention.

A power supply apparatus according to an embodiment of the present invention is a power supply apparatus for, for example, an arc welder. As shown in FIG. 1, the power supply apparatus has three power supply terminals 2a, 2b and 2c. A three-phase commercial AC voltage is applied to the three power supply terminals 2a, 2b and 2c. The AC voltage applied between the terminals 2a and 2b, between the terminals 2b and 2c and between the terminals 2c and 2a is one of a plurality of AC voltages having different magnitudes. For example, the AC voltage is the one selected from a first voltage having an effective value of 400 V and a second voltage having an effective value of 200 V. In this embodiment, the magnitude of one of the first and second voltages is a multiple of the other.

An input of an input-side rectifying circuit 6 is connected to the power supply terminals 2a, 2b and 2c via input switching devices 4a, 4b and 4c, respectively. The input switching devices 4a, 4b and 4c are adapted to be manually operated. The input-side rectifying circuit 6 is formed by plural, for example, six, diodes connected into a full-bridge configuration. The rectifying circuit 6 rectifies a commercial three-phase AC voltage applied thereto via the input switching devices 4a, 4b and 4c from the power supply terminals 2a, 2b and 2c, and develops a rectified voltage corresponding to the applied AC voltage between its output terminals 6P and 6N.

The output terminals 6P and 6N are connected through a normally open switch, e.g. a thyristor 8, to first and second, two ends 10a and 10b of a connecting circuit 10. For example, the output terminal 6P is connected through the thyristor 8 to the first end 10a of the connecting circuit 10. It should be noted that the output terminal 6N, instead of the output terminal 6P, may be connected to the second end 10b of the connecting circuit 10 through the thyristor 8.

The connecting circuit 10 includes plural, for example, four, switching devices, e.g. relay contacts 12a, 12b, 12c and 12d. The relay contacts 12a, 12b, 12c and 12d are connected in series in the named order between the first and second ends 10a and 10b, with the relay contact 12a connected to the first end 10a and with the relay contact 12d connected to the second end 10b. The relay contacts 12a and 12d connected respectively to the two ends 10a and 10b are driven to be opened and closed by a relay driving circuit 14a, while the intermediate two relay contacts 12b and 12c are driven to be opened and closed by a relay driving circuit 14b.

The inputs of plural, for example, two, inverters 16a and 16b are connected to the connecting circuit 10. For example, one input of the inverter 16a is connected to the first end 10a of the connecting circuit 10, while the other input is connected to the junction of the relay contacts 12c and 12d. One input of the inverter 16b is connected to the junction of the relay contacts 12a and 12b, with the other input connected to the second end 10b of the connecting circuit 10.

Thus, when the relay contacts 12a and 12d are closed, with the relay contacts 12b and 12c opened, the input sides of the inverters 16a and 16b are connected in parallel, so that the inverters 16a and 16b are connected in parallel between the output terminals 6P and 6N of the rectifying circuit 6 through the thyristor 8. On the other hand, when the relay contacts 12a and 12d are opened, with the relay contacts 12b and 12c closed, the inverters 16a and 16b are connected in series, and connected between the output terminals 6P and 6N of the rectifying circuit 6 through the thyristor 8. Accordingly, regardless whether the 400 V AC voltage or the 200 V AC voltage is applied to the power supply terminals 2a, 2b and 2c, a voltage having a predetermined magnitude, for example 200V AC voltage is applied to the inverters 16a and 16b. A capacitor 18a is connected between the input terminals of the inverter 16a, and a capacitor 18b is connected between the input terminals of the inverter 16b.

A known full-bridge or half-bridge type inverter including a plurality of semiconductor switching devices, e.g. bipolar transistors, FETs or IGBTs, may be used as each of the inverters 16a and 16b. The inverters 16a and 16b each develop a high-frequency voltage at an output thereof. The high-frequency voltages developed by the inverters 16a and 16b are voltage transformed to predetermined voltages by voltage-transformers 20a and 20b connected to the respective outputs of the inverters 16a and 16b. The voltage-transformed high-frequency voltages are applied to an output-side rectifying circuit 22 where they are converted to a DC voltage. The resultant DC voltage is adapted to be applied to a DC load (not shown) via output terminals 24P and 24N. It should be noted that, for an AC load, the output of the output-side rectifying circuit 22 is converted to an AC voltage by means of a DC-to-AC converter (not shown) before being applied to the AC load via the output terminals 24P and 24N.

A control circuit 26 controls the thyristor 8, the relay driving circuits 14a and 14b and the inverters 16a and 16b. The control circuit 26 may be realized by using a microcomputer, for example. In FIG. 1, the functions performed by a microcomputer used for the control circuit 26 are shown in block.

The control circuit 26 includes a thyristor control unit 26a, which produces a CLOSE signal, e.g. trigger signal, for closing the thyristor 8.

The control circuit 26 includes also a driving circuit control unit 26b, which controls the relay driving circuits 14a and 14b. The driving circuit control unit 26b controls the relay driving circuits 14a and 14b in such a manner that, when the relay contacts 12a and 12d are closed, the relay contacts 12b and 12c are open, and, when the relay contacts 12a and 12d are opened, the relay contacts 12b and 12c are closed, as previously described.

The control circuit 26 further includes an inverter control unit 26c, which controls the inverters 16a and 16b. The inverter control unit 26c supplies a switching signal to each of the semiconductor switching devices of the inverters 16a and 16b. The semiconductor switching devices repetitively turned on and off in response to the switching signals applied thereto to thereby generate high-frequency voltages.

The control circuit 26 includes also a judging circuit, e.g. a judging unit 26d, for controlling the operations of the thyristor control unit 26a, the driving circuit control units 26b and the inverter control unit 26c. The judging unit 26d controls an alarm circuit(AL) 42, too. The alarm circuit 42 is a circuit which provides an audio and/or visual alarm.

The AC voltage between the power supply terminals 2a and 2b is rectified by a rectifying circuit 28, and the resultant DC voltage is converted to a predetermined voltage by a DC-to-DC converter 30. The control circuit 26 starts to operate when the predetermined voltage is applied to it from the DC-to-DC converter 30. It should be noted that, instead of the voltage between the terminals 2a and 2b, the AC voltage applied between the power supply terminals 2b and 2c or 2a and 2c can be rectified for the same purpose. Alternatively, the rectifying circuit 28 can be configured to rectify the three-phase commercial AC voltage applied to the power supply terminals 2a, 2b and 2c, like the rectifying circuit 6.

The predetermined voltage developed by the DC-to-DC converter 30 is applied, as it is, to one contact 34a of a changeover switch 34 in an inverter connection indicative signal generating circuit 32. A voltage resulting from lowering the predetermined voltage from the DC-to-DC converter 30 by means of voltage lowering resistors 36a and 36b of the inverter connection indicative signal generating circuit 32 is applied to the other contact 34b of the changeover switch 34. A contact arm 34c of the switch 34 can be manually connected to either of the contacts 34a and 34b. The contact arm 34c is connected to the judging unit 26d.

When the contact arm 34c is connected to the contact 34a, a first inverter connection indicative signal, for example, a voltage at a high level, is applied to the judging unit 26d and the driving circuit control unit 26b. When the arm 34c is in contact with the contact 34b, a second inverter connection indicative signal, for example, a voltage at a low level, is applied to the judging unit 26d and the driving circuit control unit 26b.

When the first inverter connection indicative signal, i.e. the voltage at the high level, is applied via the changeover switch 34 to the driving circuit control unit 26b, the driving circuit control unit 26b controls the relay driving circuits 14a and 14b in such a manner that the relay switches 12a and 12d are opened and the relay switches 12b and 12c are closed, i.e. the inverters 16a and 16b are connected in series. When the second inverter connection indicative signal., i.e. the voltage at the low level, is applied to the driving circuit control unit 26b, the driving circuit control unit 26b controls the relay driving circuits 14a and 14b to cause the relay switches 12a and 12d to be closed, and to cause the relay switches 12b and 12c to be opened, so that the inverters 16a and 16b are connected in parallel.

Figure 3:
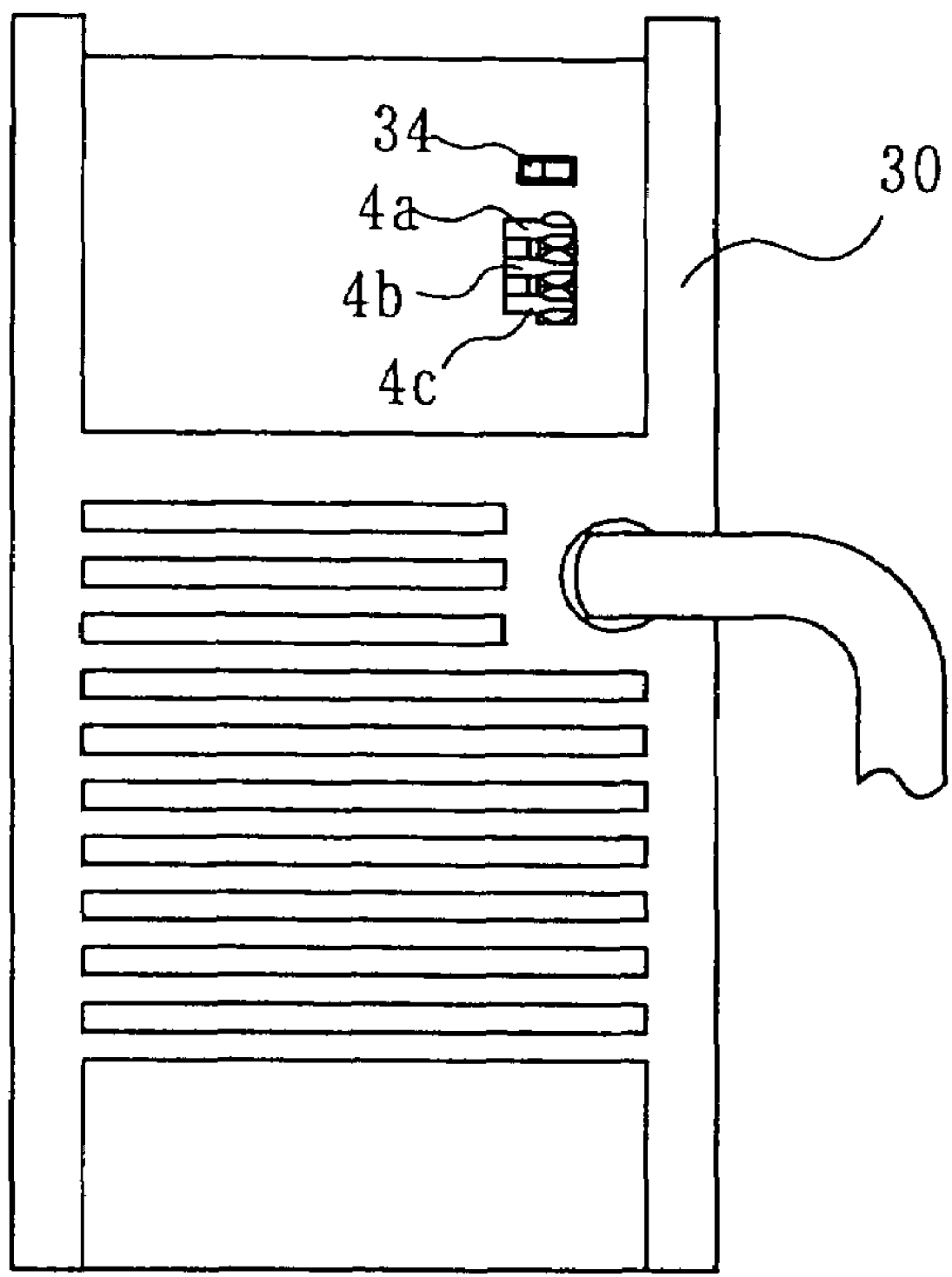
FIG. 3 is a rear view of the power supply apparatus of FIG. 1.

As shown in FIG. 3, the changeover switch 34 is physically disposed on a casing 40 of the power supply apparatus. For example, the switch 34 is disposed near the input switching devices 4a, 4b and 4c, which are disposed on the rear wall of the casing 40.

The voltage between the power supply terminals 2a and 2b is also applied to a voltage detecting circuit 38, which is arranged to provide the judging unit 26d with the voltage at the high level (i.e. the first inverter connection indicative signal) when the voltage between the power supply terminals 2a and 2b is 400 V, and with the voltage at the low level (i.e. the second inverter connection indicative signal) when voltage between the power supply terminal 2a and 2b is 200 V. The voltage detecting circuit 38 operates when the DC-to-DC converter 30 is providing the predetermined voltage to the control circuit 26.

The judging unit 26d judges whether the inverter connection indicative signal from the voltage detecting circuit 38 match the inverter connection indicative signal from the inverter connection indicative signal generating circuit 32. When the two inverter connection indicative signals match, i.e. when the both signals are at the high level or at the low level, the judging unit 26d provides the driving circuit control unit 26b with a continuation signal so that the driving control unit 26b continues the current control of the relay driving circuits 14a and 14b, thereafter, provides the thyristor control unit 26a with a trigger signal generation directing signal to direct the thyristor control unit 26a to supply a trigger signal to the thyristor 8, and provides, a predetermined time after that, the inverter control unit 26c with an inverter operation initiation causing signal for causing the inverter control unit 26c to direct the inverters 16a and 16b to start operation.

When the inverter connection indicative signals from the voltage detecting circuit 38 and the inverter connection indicative signal generating circuit 32 do not match, i.e. when one of the two inverter connection indicative signals is at the high level while the other is at the low level, the judging unit 26d activates the alarm circuit 42. It should be noted, however, that none of the thyristor control unit 26a, the driving circuit control unit 26b and the inverter control unit 26c is activated in this case.

Figure 2:
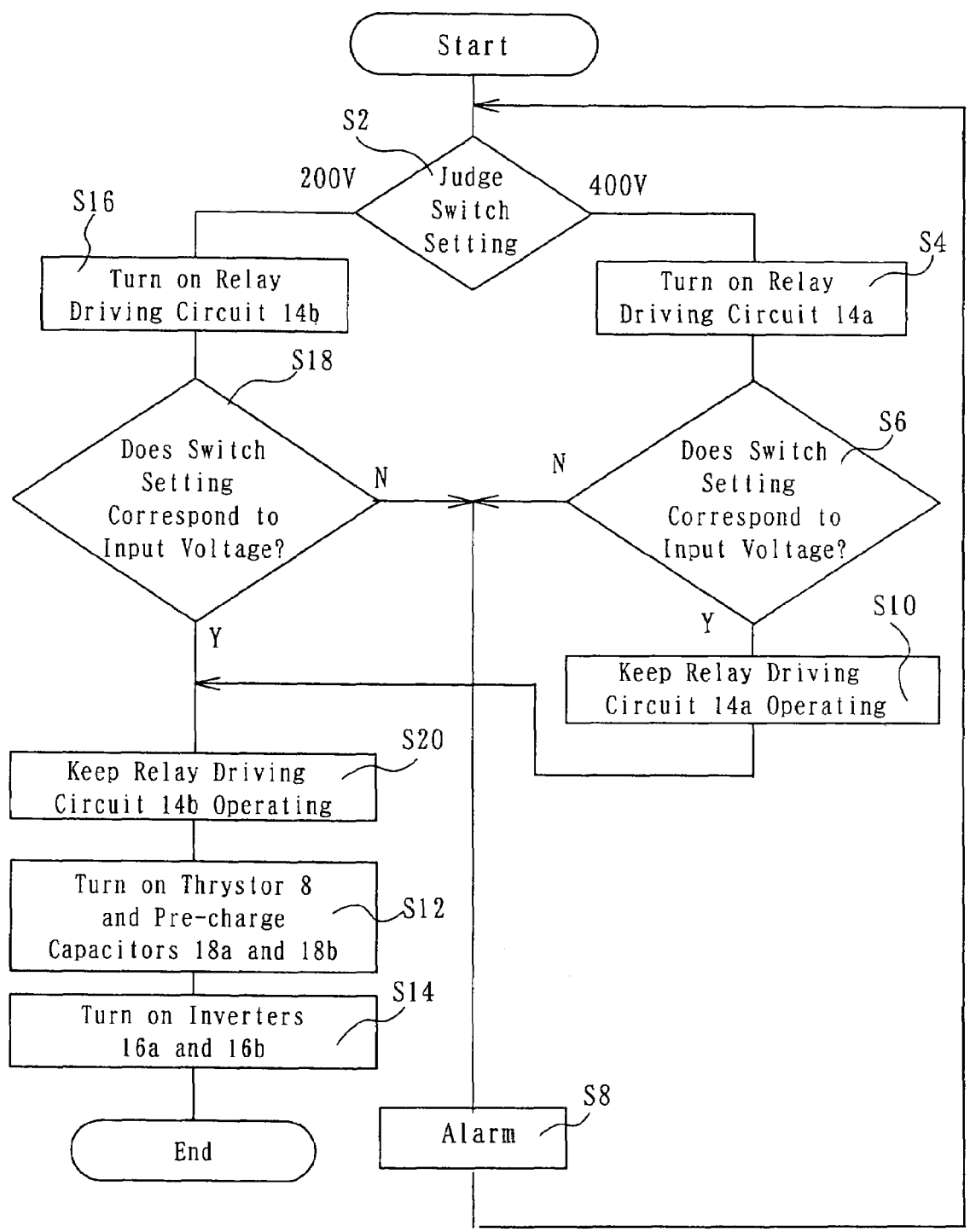
FIG. 2 is a flow chart of the operation of the power supply apparatus of FIG. 1.

FIG. 2 is a flow chart illustrating the operation of the control circuit 26 of the power supply apparatus shown in FIG. 1. When the input switching devices 4a, 4b and 4c are closed while an AC voltage is being applied to the power supply terminals 2a, 2b and 2c, a DC voltage is supplied from the rectifying circuit 28 and DC-to-DC converter 30 to the control circuit 26, causing the control circuit 26 to operate in the manner shown in FIG. 2. At this time, the thyristor 8 is open, the relay contacts 12a through 12d are open, and the inverters 16a and 16b are not operating.

First, the setting of the changeover switch 34 is judged (Step S2). Specifically, which level the inverter connection indicative signal is assuming, the high level or the low level, is judged from the setting of the changeover switch 34 of the inverter connection indicative signal generating circuit 32. If the inverter connection indicative signal at the high level is being supplied, which means that the user of the power supply apparatus assumes that the 400 V AC voltage is to be applied to the power supply terminals 2a, 2b and 2c, the relay driving circuit 14a is turned on (Step S4) to close the relay contacts 12a and 12d. This makes the series combination of the inverters 16a and 16b ready to be connected through the thyristor 8 between the output terminals 6P and 6N of the rectifying circuit 6.

Next, it is judged whether the inverter connection indicative signals from the voltage detecting circuit 38 and the changeover switch 34 match or not (Step S6). In other words, judgment is made as to whether the AC voltage actually applied to the power supply terminals 2a, 2b and 2c is 400 V as has been judged in Step S2. If the judgment is negative (N), i.e. if the AC voltage applied to the power supply terminals 2a, 2b and 2c is not 400 V, the alarm circuit 42 is actuated (Step S8), and Step S2 is executed again.

On the other hand, if the judgment made in Step S6 is affirmative (Y), i.e. if the voltage applied to the power supply terminals 2a, 2b and 2c is 400 V as has been judged in Step S2, the operation of the relay driving circuit 14a is maintained (Step S10). After that, a trigger signal is applied to the thyristor 8 to turn on the thyristor 8 (Step S12). This causes pre-charging of the capacitors 18a and 18b to be started. Thereafter, switching signals are applied to the inverters 16a and 16b to cause them to generate high-frequency voltages (Step S14).

If it is judged in Step S2 that the inverter connection indicative signal at the low level is being supplied from the changeover switch 34, which means that the user of the power supply apparatus assumes that the voltage of 200 V is to be applied to the voltage supply terminals 2a, 2b and 2c, the relay driving circuit 14b is activated (Step S16) to close the relay contacts 12b and 12c. This makes the parallel combination of the inverters 16a and 16b ready to be connected between the output terminals 6P and 6N of the rectifying circuit 6 through the thyristor 8. Next, whether the inverter connection indicative signals from the voltage detecting circuit 38 and the changeover switch 34 match or not is judged (Step S18). In other words, it is judged whether or not the AC voltage actually applied to the power supply terminals 2a, 2b and 2c has a magnitude of 200 V as judged in Step S2. If the judgment is negative (N), that is, if the AC voltage applied to the terminals 2a, 2b and 2c is not 200 V, the processing of Step S8 is executed to operate the alarm circuit 42 so that the processing in Step S2 is executed again.

If the judgment made in Step S18 is affirmative (Y), the operating state of the relay driving circuit 14b is maintained (Step S20). Then, the Steps S12 and S14 are successively executed to turn on the thyristor 8, and, thereafter, the inverters 16a and 16b are activated (Step S14).

As described above, when the inverter connection indicative signals from the changeover switch 34 and the voltage detecting circuit 38 do not match, the alarm circuit 42 is activated. For example, if the voltage detecting circuit 38 provides the inverter connection indicative signal at the low level, i.e. the AC voltage actually applied is 200 V, while the changeover switch 34 is set to provide the inverter connection indicative signal at the high level, the alarm circuit 42 is activated so that the operator of the apparatus can change the state of the changeover switch 34. The alarm circuit 42 is ready to start to operate immediately after the input switching devices 4a, 4b and 4c are closed. Since the changeover switch 34 is disposed near the input switching devices 4a, 4b and 4c on the casing of the power supply apparatus, it can be switched to the correct position immediately when the alarm circuit 42 is activated.

The switching of the changeover switch 34 causes the relay contacts 12a and 12d of the connecting circuit 10 to be opened and the relay contacts 12b and 12c to be closed. During the changeover of the connecting circuit 10, the thyristor 8 is kept open, and, therefore, no voltage is coupled to the connecting circuit 10, so that the changeover of the connecting circuit 10 does not cause any damages to the relay contacts 12a-12d and the inverters 16a and 16b. After that, the thyristor 8 is automatically turned on, and the inverters 16a and 16b start operating. It may be arranged such that, when the alarm circuit 42 is activated, the input switching devices 4a, 4b and 4c may be opened, followed by the re-setting of the changeover switch 34 to the correct position, and, then, followed by the closing of the input switching devices 4a, 4b and 4c.

Similar operation takes place when the changeover switch 34 develops the inverter connection indicative signal at the low level, which indicates that the 200 V AC voltage is to be applied, while the AC voltage actually applied to the power supply terminals 2a, 2b and 2c is 400 V.

In the above-described embodiment, a microcomputer is used as the control circuit 26 in order to realize the functions of the thyristor control unit 26a, the relay contact driving circuit control unit 26b, the inverter control unit 26c, and the judging control unit 26d, but the thyristor control unit 26a, the relay contact driving circuit control unit 26b, the inverter control unit 26c, and the judging control unit 26d may be realized by the use of logic circuits.

The power supply apparatus has been described as the one for an arc welding machine, but it may be used as a power supply apparatus for other machines, such as an arc cutter, a plasma cutter and a light source.

Instead of voltages of 400 V and 200 V, commercial AC voltages may be, for example, 200 V and 100 V. Further, the power supply apparatus may be arranged to receive one of three or more different AC voltages instead of two AC voltages. For example, when the power supply apparatus is to receive one of voltages of 100 V, 200 V and 400 V, four inverters may be used. In such case, the connecting circuit 10 is arranged to connect the four inverters in the following manner. When a voltage of 100 V is to be received, all of the four inverters are connected in parallel. For receiving a voltage of 200 V, two series combinations each consisting of two of the four inverters are connected in parallel, and, for receiving a voltage of 400 V, the four inverters are connected in series.

The connecting circuit 10 of the above-described embodiment is formed by the use of relay contacts, but it may be formed by the use of, for example, semiconductor switching devices, such as bipolar transistors, FETs, and IGBTs.

The power supply apparatus of the described embodiment includes three power supply terminals 2a, 2b and 2c to receive a three-phase commercial AC voltage, the power supply apparatus may be arranged to include two power supply terminals, between which a single-phase commercial AC voltage is applied.

Further, in place of the thyristor 8, a relay may be used.

What is claimed is:

1. A power supply apparatus comprising:
   a plurality of power supply terminals to which one of a plurality of different voltages is adapted to be applied;
   a rectifying circuit for rectifying a voltage coupled thereto from said power supply terminals to develop, between two output terminals thereof, a rectified voltage in accordance with the coupled voltage;
   a plurality of inverters;
   a connecting circuit for connecting said plurality of inverters into one of a plurality of inverter connections in response to an inverter connection indicative signal applied thereto, said inverter connections corresponding to respective ones of said plurality of different voltages and being arranged such that a predetermined voltage can be applied to each of said inverters whichever one of said plurality of different voltages is applied to said power supply terminals;
   an inverter connection indicative signal generating circuit manually operated to generate said inverter connection indicative signal corresponding to one of said plurality of inverter connections;
   a normally open switch disposed in a path extending between said two output terminals of said rectifying circuit and said plurality of inverters, said normally open switch being closed in response to a CLOSE signal applied thereto;
   a voltage detecting circuit for generating said inverter connection indicative signal corresponding to one of said plurality of voltages as applied to said power supply terminals;
   a judging circuit for judging, when one of said plurality of voltages is applied to said power supply terminals, whether said inverter connection indicative signal generated by said voltage detecting circuit matches said inverter connection indicative signal generated by said inverter connection indicative signal generating circuit;
   a normally-open-switch driving circuit for supplying said normally open switch with said CLOSE signal when said judging circuit judges that said inverter connection indicative signals from said voltage detecting circuit and said inverter connection indicative signal generating circuit match; and
   an alarm circuit activated to provide an alarm when said judging circuit judges that said inverter connection indicative signal from said voltage detecting circuit does not match said inverter connection indicative signal generated by said inverter connection indicative signal generating circuit.

2. The power supply apparatus according to claim 1, further comprising a manually operable input switching device connected between said plurality of power supply terminals and said rectifying circuit.

3. The power supply apparatus according to claim 2, wherein said inverter connection indicative signal generating circuit includes a manually operable switch physically disposed near said input switching device.

4. The power supply apparatus according to claim 1, wherein:
   said plurality of voltages are first and second voltages, said second voltage being lower than said first voltage;
   said plurality of inverters are two inverters;
   said connecting circuit connects said two inverters into a first inverter connection in which said two inverters are connected in series between said two output terminals of said rectifying circuit, or into a second inverter connection in which said two inverters are connected in parallel between said two output terminals of said rectifying circuit;
   said inverter connection indicative signal generating circuit generates a first inverter connection indicative signal indicative of said first inverter connection or a second inverter connection indicative signal indicative of said second inverter connection; and
   said voltage detecting circuit generates said first inverter connection indicative signal when said first voltage is applied to said power supply terminals, and said second inverter connection indicative signal when said second voltage is applied to said power supply terminals.

5. The power supply apparatus according to claim 1, wherein:
   each of said inverters includes a capacitor connected in an input thereof, said capacitor being charged when said normally open switch is closed; and
   each of said inverters is driven by an inverter driving circuit, said inverter lo driving circuit driving the associated inverter after the completion of the charging of the capacitor of said associated inverter when said judging circuit judges that the inverter connection indicative signal from said voltage detecting circuit matches the inverter connection indicative signal from said inverter connection indicative signal generating circuit.

* * * * *